United States Patent [19]

Iizuka et al.

[11] Patent Number: 5,477,128
[45] Date of Patent: Dec. 19, 1995

[54] AUTOMATIC CHARGING APPARATUS

[75] Inventors: Souichi Iizuka, Tokyo; Yasuharu Yamada, Chiba; Sohei Kuhara, Tokyo, all of Japan

[73] Assignee: Technical Associates Co., Ltd., Tokyo, Japan

[21] Appl. No.: 252,415

[22] Filed: Jun. 1, 1994

[30] Foreign Application Priority Data

Jul. 30, 1993 [JP] Japan .................... 5-206975

[51] Int. Cl.$^6$ .................................................. H02J 7/10
[52] U.S. Cl. ................................................................ 320/39
[58] Field of Search ........................... 320/20, 21, 27, 320/28, 30, 39, 40, 49, 54; 363/25, 26, 27, 85–87

[56] References Cited

U.S. PATENT DOCUMENTS

| | | | |
|---|---|---|---|
| 3,736,490 | 5/1973 | Fallon et al. | 320/39 |
| 3,987,354 | 10/1976 | Mason | 320/39 |
| 4,031,451 | 6/1977 | Gordon | 320/39 X |
| 4,128,798 | 12/1978 | Takei | 320/39 X |
| 5,029,266 | 7/1991 | Randolph | 320/39 X |
| 5,051,883 | 9/1991 | Cheng | 363/87 X |
| 5,179,335 | 1/1993 | Nor | 320/21 |
| 5,254,930 | 10/1993 | Daly | 320/39 X |

FOREIGN PATENT DOCUMENTS 52-35863  9/1977  Japan .

*Primary Examiner*—Peter S. Wong
*Assistant Examiner*—Edward Tso
*Attorney, Agent, or Firm*—Flynn, Thiel, Boutell & Tanis

[57] ABSTRACT

An automatic charging apparatus comprises a rectifier circuit composed of a plurality of diodes and thyristors, said diodes and thyristors being arranged in a bridge connection, a phase control circuit for obtaining the charging voltage of a battery by controlling the phase of said thyristors, a voltage setting resistor for setting a charging voltage suitable for the state of said battery, a current setting resistor for setting a charging current suitable for the state of said battery and a current control circuit which obtains the charging current best suited to the state of the battery by controlling the pulse width of base current flowing in a transistor connected to the outputs of said thyristors. As a result, it is possible to efficiently charge the battery with charging voltage and current best suited to the state of the battery even if the battery is of large capacity.

1 Claim, 3 Drawing Sheets

FIG. 3(a)  ei  
FIG. 3(b)  ez  
FIG. 3(c)  e  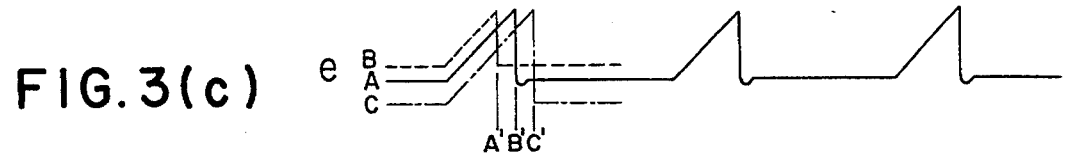
FIG. 3(d)  ep  
FIG. 3(e)  Edc  
FIG. 3(f)  Edc  
FIG. 3(g)  Ip  

AUTOMATIC CHARGING APPARATUS

BACKGROUND OF THE INVENTION

1. Field of the Invention

The present invention relates to an automatic charging apparatus employing a transformerless system which can be made small and light.

2. Description and Problems of the Related Art

Many conventional charging apparatuses for charging a battery employ a transformer system which lowers a commercial power source voltage to a charging voltage using a transformer.

However, in the case of charging a battery which outputs large current such as a power battery loaded on an electric automobile etc., the conventional transformer-system charging apparatus causes an inconvenience that it becomes large in size and heavy in weight since it requires a large-sized transformer.

In order to obviate such an inconvenience, for example, a transformerless-system automatic charging apparatus which does not use a transformer therein is proposed in the Japanese Patent Office Laid-Open Publication No. 49-4138 (the Japanese Patent Office Publication No. 52-35863).

The conventional automatic charging apparatus, however, causes inconvenience in that it is poor in charging efficiency since it is designed to charge a battery by on-off controlling a Silicon rectifier device using a voltage switching circuit composed of transistors so that it cannot charge a battery with a charging current best suited to the state of the battery even if it can be made small and light.

The present invention has been made to eliminate this inconvenience to provide an automatic charging apparatus capable of efficiently charging a battery with a charging current best suited to the state of the battery.

SUMMARY OF THE INVENTION

To attain the above object, the automatic charging apparatus according to the present invention comprises a rectifier composed of a plurality of diodes and thyristors, the diodes and thyristors being arranged in a bridge connection, a phase control circuit for obtaining the charging voltage of a battery by controlling the phase of the thyristors, a voltage setting resistor for setting a charging voltage, a current setting resistor for setting a charging current suitable for the state of the battery and a current control circuit which obtains the charging current best suited to the state of the battery by controlling the pulse width of base current flowing in a transistor connected to the voltage setting circuit.

With the arrangement set forth above, a battery of large capacity can be efficiently charged with electricity by a transformerless system, so that the apparatus can be made small and light as a whole and the life of the battery is prolonged as well since it can be charged with electricity in accordance with the state thereof.

BRIEF DESCRIPTION OF THE DRAWINGS

FIGS. 3 (a) to 3 (g) are waveform diagrams respectively showing waveforms at the portions of the voltage control circuit and the current control circuit which constitute the automatic charging apparatus according to the embodiment of the present invention.

DESCRIPTION OF THE PREFERRED EMBODIMENT

An embodiment of the present invention will be described in detail with reference to drawings hereinafter.

Figure 1:
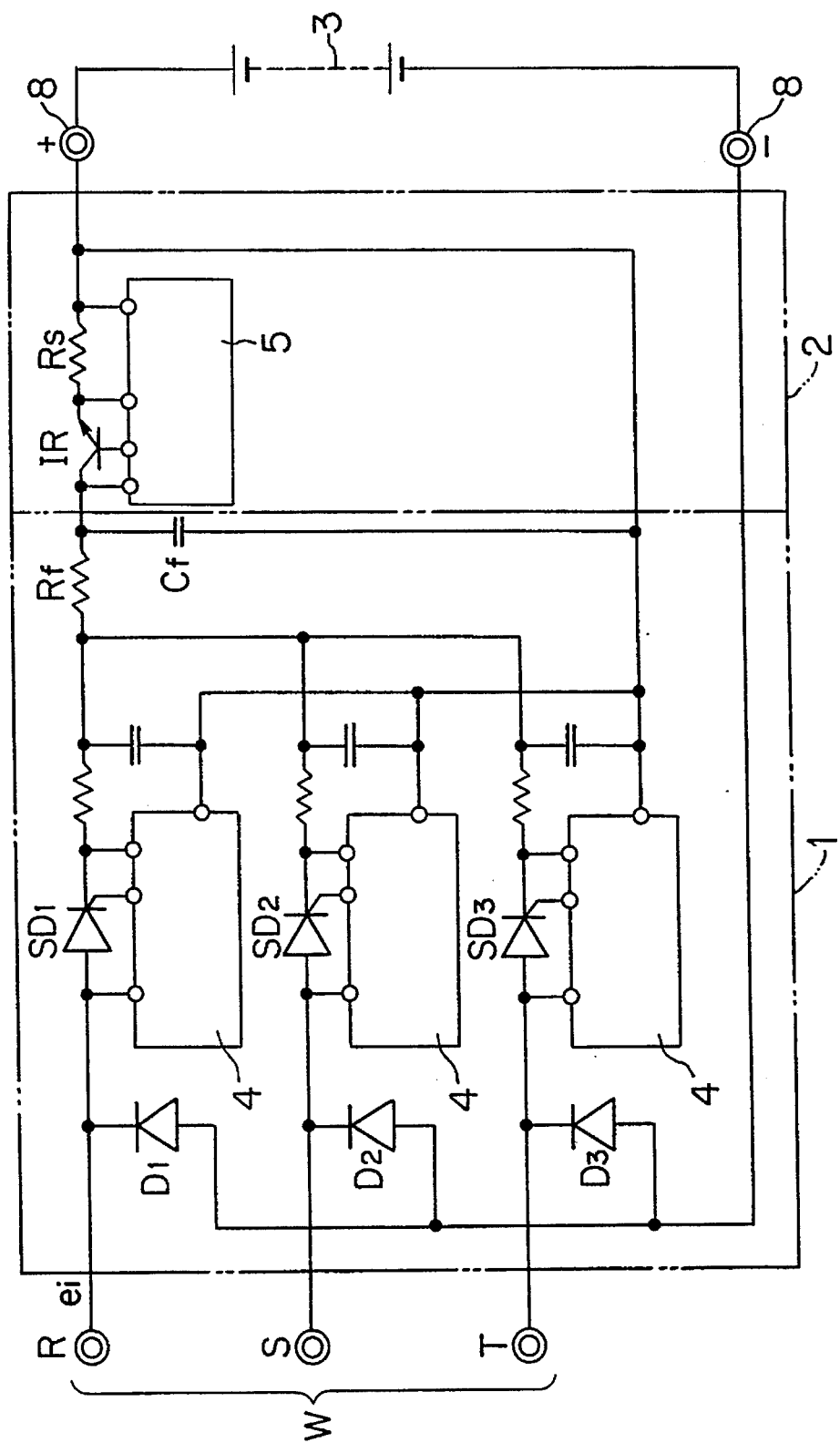
FIG. 1 is a circuit diagram of an automatic charging apparatus according to an embodiment of the present invention.
Figure 2:
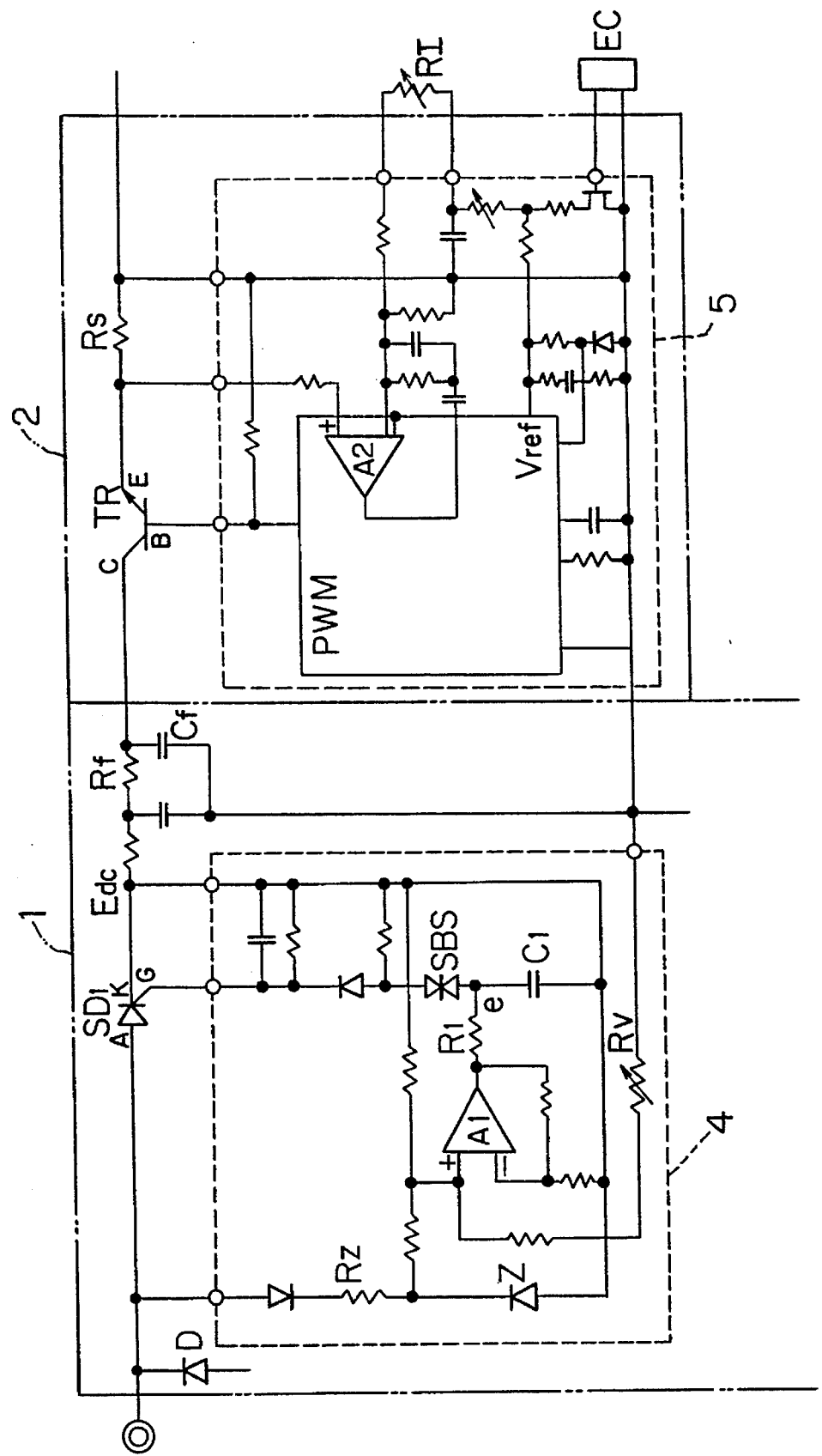
FIG. 2 is a detailed circuit diagram of a voltage control circuit and a current control circuit which constitute the automatic charging apparatus according to the embodiment of the present invention.

FIG. 1 is a circuit diagram of the automatic charging apparatus, FIG. 2 is a detailed circuit diagram of a voltage control circuit and a current control circuit which constitute the automatic charging apparatus and FIG. 3 is a waveform diagram showing waveforms of signals at the portions of the voltage control circuit and the current control circuit.

In FIGS. 1 and 2, denoted at I is a voltage control circuit for setting a voltage in accordance with that of a battery 3 to be charged with electricity and 2 is a current control circuit for controlling a charging current.

A three-phase (it may be a single-phase) commercial power source is connected to the voltage control circuit 1 to input an alternating current W thereto, wherein the input alternating current is rectified by a three-phase full-wave hybrid rectifier composed of diodes $D_1$, $D_2$ and $D_3$ and thyristors $SD_1$, $SD_2$ and $SD_3$ provided for phases R, S and T respectively, the diodes $D_1$, $D_2$ and $D_3$ and thyristors $SD_1$, $SD_2$ and $SD_3$ being arranged in a bridge connection.

A phase control circuit 2 illustrated in FIG. 4 is connected to each of the thyristors $SD_1$, $SD_2$ and $SD_3$.

FIG. 3 shows only a phase R among the three phases R, S and T omitting the other two phases S and T since they are identical to the phase R in shape.

The phase control circuit 4 includes a resistor Rz and a Zener diode Z which generate a reference voltage ez illustrated in FIG. 3 (b) for phase control by clamping a rectified voltage ei illustrated in FIG. 3 (a) and a voltage setting variable resistor Rv for setting a charging voltage according to the voltage of a battery 3, the variable resistor Rv feeding back an output voltage Edc and a reference voltage ez to the positive input terminal of an arithmetic circuit $A_1$ composed of an operational amplifier.

The output voltage Edc of the thyristor $SD_1$ (denoted at e in FIG. 3) is negatively fed back to the arithmetic circuit $A_1$ to be reduced from the reference voltage ez, the result of the reduction being integrated by an integrating circuit composed of a resistor $R_1$ and a capacitor $C_1$ connected to the output side of the arithmetic circuit A1 so as to be supplied to a trigger diode SBS.

That is, the output of the arithmetic circuit $A_1$ is integrated in the integrating circuit to become a voltage e having a saw-tooth waveform as illustrated in FIG. 3 (c).

The inclination angle of the voltage e remains constant since the time constant is unchanged, but the amount of the output voltage Edc fed back to the arithmetic circuit $A_1$ is changed by the variable resistor Rv so that different charge starting voltages are applied to the trigger diode SBS although the charge starting points of the saw-tooth-waveform voltages remain unchanged as denoted at B and C in FIG. 3 (c).

The trigger diode SBS generates a trigger pulse when a trigger voltage reaches, for example, 8 V, so that the position of the pulse is shifted as denoted at A', B' and C' in case of saw-tooth-waveform voltages A, B and C respectively as illustrated in ep, FIG. 3 (d).

The pulse triggers the thyristor $SD_1$ to control the phase angle and the output voltage.

As a result, the thyristor $SD_1$ becomes conductive so that the output voltage Edc corresponding to a continuity angle is output to a current control circuit 2 by way of a smoothing circuit composed of a resistor Rf and a capacitor Cf.

The current control circuit 2 comprises a transistor TR and a current control circuit 5 composed of a pulse width modulation (PWM) IC which is connected to the base B of the transistor TR and the voltage control circuit 1 applies the output voltage Edc thereof to the collector C of the transistor TR.

A shunt resistor Rs is connected to the emitter E of the transistor TR and a voltage generated by a current flowing in the shunt resistor Rs is input to the positive input terminal of an operational amplifier $A_2$ provided in the current control circuit 5 while a reference voltage Vref generated in the current control circuit 5 is divided to be input to the negative input terminal of the operational amplifier $A_2$.

The reference voltage Vref can be changed by a current setting variable resistor RI.

The current control circuit 5 further includes an external terminal EC for controlling the reference voltage Vref based on the state of the battery by way of a microcomputer, not shown, connected to the external terminal EC, etc.

The operation of the automatic charging apparatus will be described hereinafter. In case of charging a battery 3 with electricity, the battery 3 to be charged is connected to the charging terminal 8 illustrated in FIG. 1 then the variable resistor Rv in the voltage control circuit 1 is operated to set the charging voltage best suited to the state of the battery 3.

Thereafter the charging current of the battery 3 is set to be best suited to the state of the battery 3 by way of the current setting variable resistor RI in the current control circuit 2.

When an alternating current source W supplies an alternating current to the automatic charging apparatus at this state, the three-phase full-wave hybrid rectifier therein composed of the diodes $D_1$, $D_2$ and $D_3$ and thyristors $SD_1$, $SD_2$ and $SD_3$ rectifies the alternating current and the phase control circuit 4 controls the thyristors $SD_1$, $SD_2$ and $SD_3$ in phase so that the output voltage Edc (refer to FIG. 3 (e)) corresponding to the change of continuity angle is output to the current control circuit 2 by way of the smoothing circuit.

FIG. 3 (e) shows a waveform of one phase alone, but actually the output voltage Edc has a waveform as illustrated in FIG. 3 (f).

On the other hand the current control circuit 2 compares a voltage generated in the shunt resistor Rs connected to the emitter E of the transistor TR with the reference voltage Vref generated in the current control circuit 5 in the operational amplifier $A_2$ and outputs a pulse train Ip (refer to FIG. 3 (g)) having a pulse width which is proportional to a current value set by the current setting variable resistor RI to the base B of the transistor TR.

As a result, the transistor TR is conductive while the pulse train Ip is supplied thereto, so that a current corresponding to a pulse width specified by the current setting variable resistor RI is supplied to the battery 3 to charge the same with electricity.

When the pulse width is small, the current becomes small while when the pulse width is large, the current becomes large.

A case in which the charging current is set by the current setting variable resistor RI in the current control circuit 2 according to the state of the battery 3 has been described above, but it is also possible to control the charging current by connecting a control circuit which uses a microcomputer or ROM to the external terminal EC provided in the current control circuit 5.

If a plurality of charging patterns set in accordance with the state of the battery 3 are previously stored in the memory or ROM of a microcomputer, a charging pattern best suited to the battery 3 to be charged with electricity among the charging patterns is selected, the terminal voltage of the battery 3 is detected and the reference voltage Vref is controlled by way of the external terminal EC while being compared with the charging pattern, it is possible to efficiently charge the battery 3 with a charging pattern best suited to the battery 3 even if the conditions of the battery 3 to be charged changes variously.

As described above in detail, since the automatic charging apparatus according to the present invention reduces the voltage of a commercial power source to the charging voltage of a battery without using a transformer, it does not require a large transformer even in case of charging a battery of large capacity such as that used in an electric automobile, so that it is possible to make the charging apparatus small and light.

Accordingly if the automatic charging apparatus is loaded on an electric automobile etc. in advance, it is possible to easily charge a battery with electricity using a commercial power source even if the battery is exhausted on the road and to save energy since the weight of the charging apparatus is not a burden on the automobile while it is running.

Moreover, it is possible to efficiently charge the battery since a rapid charge or a trickle charge is possible with charging voltage and current best suited to the state of the battery, and to prolong the life of the battery since it is free from overcharge.

Furthermore, since the charging apparatus can be composed of a comparatively simple circuit, it can be provided cheap and have high reliability.

What is claimed is:

1. An automatic charging apparatus comprising:

a rectifier composed of a plurality of diodes and thyristors, said diodes and thyristors being arranged in a bridge connection;

a phase control circuit for obtaining the charging voltage of a battery by controlling the phase of said thyristors;

a voltage setting resistor for setting a charging voltage in accordance with the voltage of said battery;

a current setting resistor for setting the charging current of said battery; and a current control circuit which obtains the charging current best suited to said battery by controlling the pulse width of base current flowing in a transistor connected to the outputs of said thyristors.

* * * * *